UNITED STATES PATENT OFFICE.

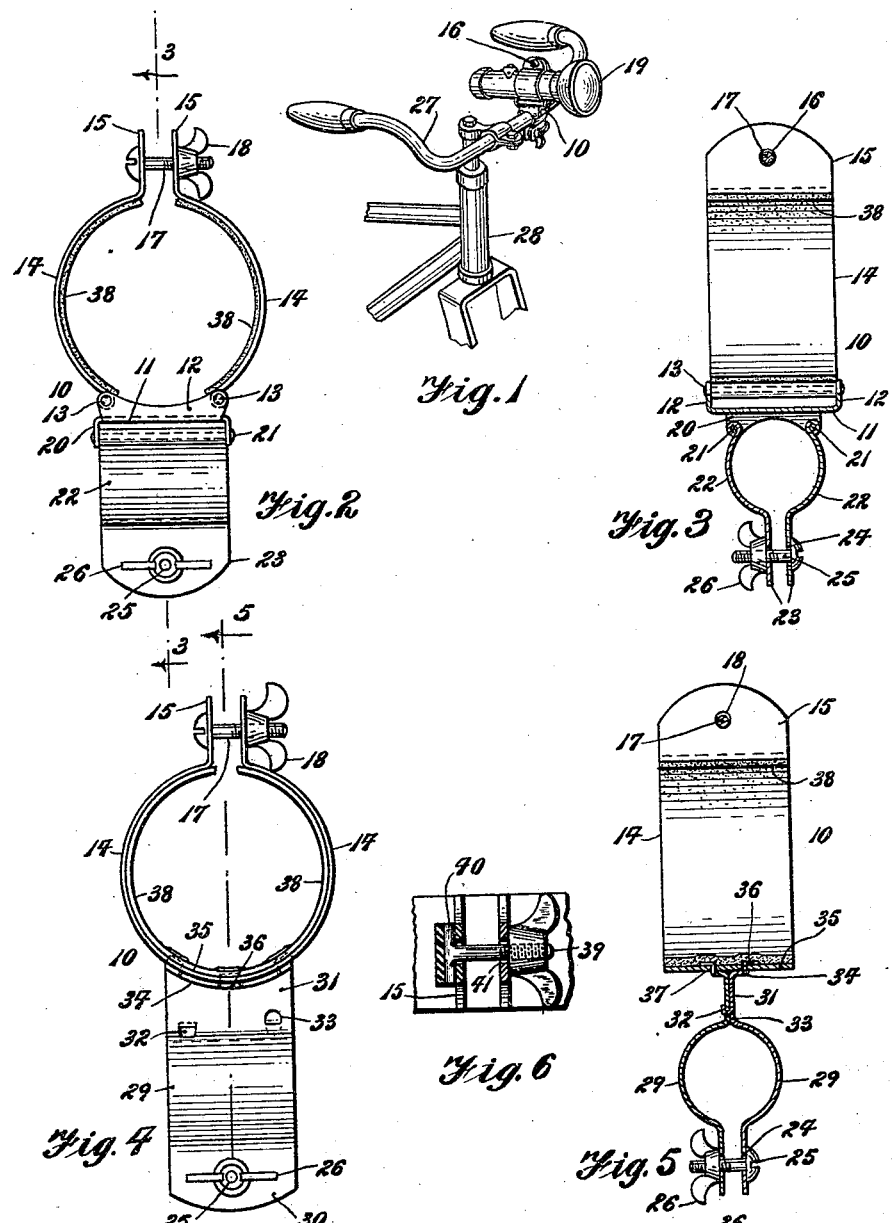

CHARLES T. HARNED, OF PHILADELPHIA, PENNSYLVANIA.

LAMP HOLDER.

1,413,530. Specification of Letters Patent. Patented Apr. 18, 1922.

Application filed May 23, 1919. Serial No. 299,110.

*To all whom it may concern:*

Be it known that I, CHARLES T. HARNED, a citizen of the United States, residing at Philadelphia, in the county of Philadelphia and State of Pennsylvania, have invented new and useful Improvements in Lamp Holders, of which the following is a specification.

This invention relates to holders or brackets for lamps and has more particular reference to a holder for a lamp or headlight on a bicycle or motor-cycle and which is usually secured to the handle bar thereof.

The main object of my invention is to provide a lamp holder of the type referred to which is specially adapted to support an electric battery lamp and which may be readily and quickly fitted in place to support the lamp in forwardly projected position.

Another object of the invention is to provide a lamp holder of the type referred to which can be readily adjusted to hold the lamp in various projected positions so that the beam of light may be deflected as desired.

With these and other objects in view my invention consists essentially of a lamp holding member and an attaching member suitably connected with means for removably securing the lamp in position.

The invention further consists in certain novel features of construction which will be hereinafter more fully set forth.

In the further disclosure of my invention, reference will be had to the accompanying sheet of explanatory drawings, constituting a part of this specification, in which similar characters of reference denote the same or corresponding views in all the figures.

Figure 1— is a perspective view of a portion of a bicycle and handle bars thereof, with my holder attached thereto and also showing a lamp in position.

Figure 2— is a front elevation of a lamp holder embodying the present improvements.

Figure 3— is a sectional view taken on the line 3—3 in Figure 2, and looking in the direction of the arrows.

Figure 4— is a front elevation of a slightly modified form of my invention; and

Figure 5— is a sectional view taken on the line 5—5 in Figure 4, and looking in the direction of the arrows.

Figure 6— is a fragmentary detail of a slightly varied locking means hereinafter more fully explained.

Referring more particularly to the views, the numeral 10 designates the improved lamp holder in its entirety, and referring more particularly to Figures 1 to 3 inclusive, said lamp holder consists essentially of a main or body portion 11, which is conveniently rectangular in plan, and provided with spaced upstanding ears or flanges 12, between which are hinged at 13, curved members 14, the free ends whereof are extended upwardly to form flanges 15, which can be held or gripped in spaced relation. These flanges 15, are perforated at 16 to receive a threaded bolt 17 in engagement with which is a winged nut 18, by means of which said flanges 15 are brought together to compress the curved members 14 around an electric battery lamp 19.

Depending from the underside of the main or body portion 11, and at right angles to the aforesaid ears or flanges 12, are spaced wings or webs 20, between which are hinged at 21, curved members 22, the free depending ends whereof are fashioned to constitute flanges 23, which are perforated at 24, to receive a threaded bolt 25, in engagement with which is a winged nut 26 by means of which the curved members 22 are compressed to firmly grip the handle bar 27 of a bicycle 28, for example.

Referring now to Figures 4 and 5, the lamp holder consists of an upper lamp holding member and a lower attaching member, the latter preferably being made in sections consisting of curved members 29 having lower terminal flanges 30 which are adapted to be normally slightly out of contact but arranged to be compressed by the threaded bolt 25, and winged nut 26. The upper portions of the curved members 29 are extended upwardly to form webs 31, which are held in close relation by portions 32 on the one web projecting through openings 33, in the other and being bent over and firmly pressed down thereon, and said webs 31, terminate in laterally extending arms or flanges 34, which are fastened to the bottom portion 35 of the upper lamp holding curved member 14 and form a seat therefor, tongues 36 on the flanges 34, fitting into slots 37 in the bottom of the curved member 14 and being firmly compressed thereon.

Suitable lining strips 38 of baize or felt may be cemented in the curved members 14 to prevent injury to the lamp 19.

Instead of employing a loose or removable bolt 17, I may use a bolt 39 as shown in Figure 6, which is provided with laterally extending pintles 40, hinged to one of the flanges 15 or 23, and fork the opposed flange 15 or 23, at 41, from which it will be readily seen that the bolt 39 is hingedly connected and the entire parts are connected together, whereby connecting and disconnecting the holder is greatly facilitated.

From the foregoing description it will be clearly apparent that by my invention I have devised a novel and useful lamp holder which fully embodies the meritorious features and advantages enumerated as desirable in the statement of the invention and the above description, and while I have in the present case, shown and described preferred embodiments thereof which will give in practice satisfactory and reliable results, it is to be understood that the same are susceptible of modification in many particulars without departing from the spirit or scope of the invention or sacrificing any of its advantages.

Having described my invention, what I claim is:—

A device of the class described comprising a substantially rectangular shaped body, upstanding ears extending from opposite sides of said body, webs extending downwardly from opposite ends of said body, a pair of oppositely disposed curved members pivotally secured to opposite ends of said ears, parallel flanges extending upwardly from the outer ends of said members provided with aligned openings, a bolt extending through the openings in said flanges, a winged nut mounted upon the nut of the bolt and engaging one of said flanges, a pair of oppositely disposed curved members pivotally secured to the opposite ends of said webs, parallel flanges extending downwardly from the outer ends of the last mentioned curved members and provided with aligned openings, a winged nut mounted upon the last mentioned bolt, and a plurality of fabricated strips secured to said curved members.

In testimony whereof I affix my signature.

CHARLES T. HARNED.